(12) United States Patent
Reiter

(10) Patent No.: US 10,204,747 B2
(45) Date of Patent: Feb. 12, 2019

(54) SERRATED ELECTRICAL CONTACTS

(71) Applicant: AMETEK, Inc., Berwyn, PA (US)

(72) Inventor: Michael Reiter, Troy, OH (US)

(73) Assignee: AMETEK, INC., Berwyn, PA (US)

( * ) Notice: Subject to any disclaimer, the term of this patent is extended or adjusted under 35 U.S.C. 154(b) by 439 days.

(21) Appl. No.: 15/209,825

(22) Filed: Jul. 14, 2016

(65) Prior Publication Data

US 2018/0019073 A1    Jan. 18, 2018

(51) Int. Cl.
| | |
|---|---|
| *H01H 1/06* | (2006.01) |
| *H01H 50/14* | (2006.01) |
| *H01H 50/54* | (2006.01) |
| *H01H 50/56* | (2006.01) |
| *H01H 50/04* | (2006.01) |
| *H02K 11/00* | (2016.01) |

(52) U.S. Cl.
CPC ............ *H01H 1/06* (2013.01); *H01H 50/047* (2013.01); *H01H 50/14* (2013.01); *H01H 50/546* (2013.01); *H01H 50/56* (2013.01); *H02K 11/0094* (2013.01)

(58) Field of Classification Search
CPC ........ H01H 50/04; H01H 50/14; H01H 50/54; H01H 50/56; H01H 1/06; H01H 50/047; H01H 50/546; H02K 11/00; H02K 11/0094
See application file for complete search history.

(56) References Cited

U.S. PATENT DOCUMENTS

| | | | | |
|---|---|---|---|---|
| 3,597,562 A | * | 8/1971 | Turnbull ............... | H01H 1/2008 200/267 |
| 5,521,566 A | * | 5/1996 | Krubsack ............... | H01H 50/14 335/126 |
| 2011/0001589 A1 | * | 1/2011 | Usami ................... | H01H 50/14 335/196 |

* cited by examiner

*Primary Examiner* — Naishadh N Desai
(74) *Attorney, Agent, or Firm* — RatnerPrestia

(57) ABSTRACT

Provided is a solenoid switch of a motor including a solenoid case, a solenoid having at least one control terminal for connection to at least one external control cable, two power terminals for connection to external power cables, two stationary serrated electrical contacts mounted within the solenoid case, where each serrated electrical contact is electrically connected to a corresponding one of the power terminals, two movable electrical contacts coupled to the solenoid and electrically connected to windings of the motor, where each movable electrical contact corresponds to one of the two serrated electrical contacts, and is movable by applied force of the solenoid. In response to a control signal received by the at least one control terminal, the solenoid is energized and moves the two movable electrical contacts to mate with the corresponding two serrated electrical contacts resulting in an electrical connection between the power cables and the motor windings.

20 Claims, 10 Drawing Sheets

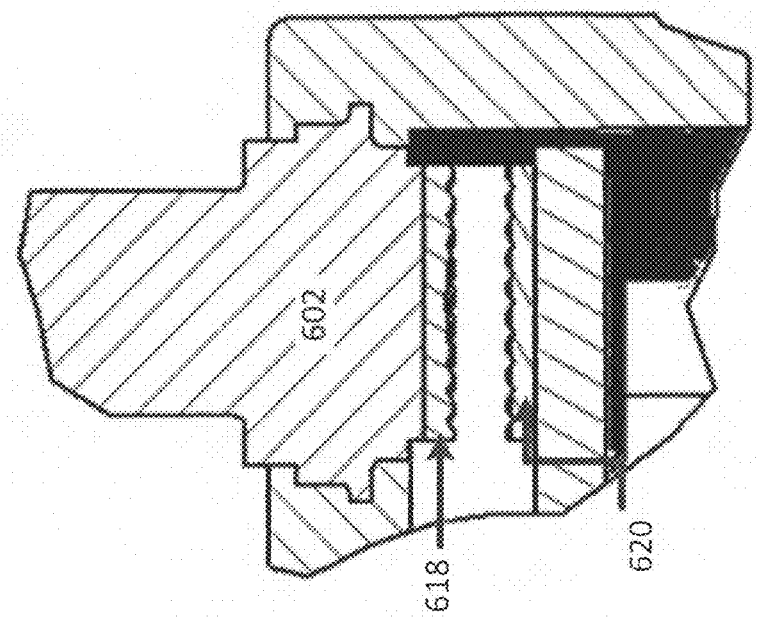
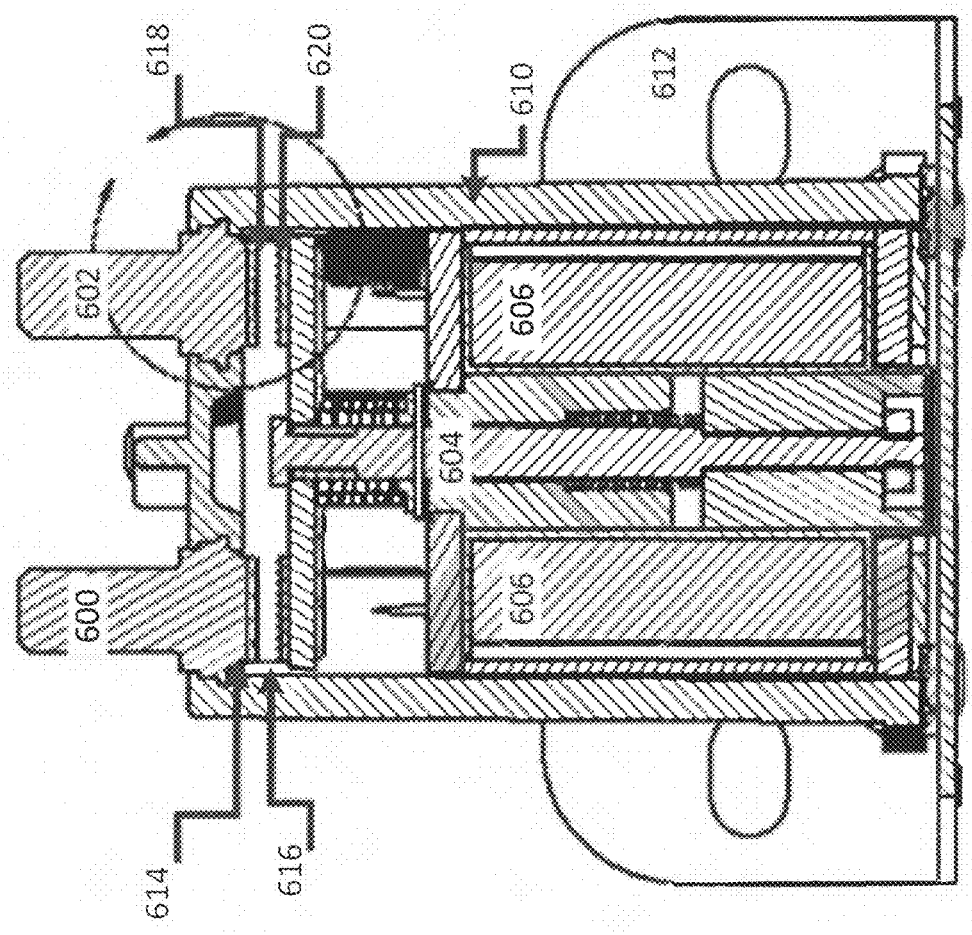
FIG. 6

SERRATED ELECTRICAL CONTACTS

FIELD

This invention relates generally to electrical contacts for use in a solenoid switch. The invention seeks to ensure proper physical mating between the connection surfaces of the electrical contacts in icy conditions.

BACKGROUND

Conventional electrical solenoid switches have electrical contacts that physically move in response to a control voltage. These contacts are physically separated to open the switch thereby de-energizing the load (e.g. an electric motor), and are physically connected (i.e. mated) to close the switch thereby energizing the load (e.g. an electric motor).

However, these solenoid switches may be installed in cold climates where icing of the internal parts becomes problematic. Over time, moisture enters the switch housing and accumulates as ice on the mating surface of the electrical contacts. When the solenoid is controlled to apply power to the load (e.g. the motor), the contacts physically move and attempt to mate with each other. However, the ice that has accumulated on the mating surface acts as an insulator and prevents proper mating. This leads to operational malfunction of the load (e.g. the motor not turning ON).

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 shows a cross sectional mechanical drawing of the solenoid with serrated contacts mating to other serrated contacts.

SUMMARY

Figure 1:
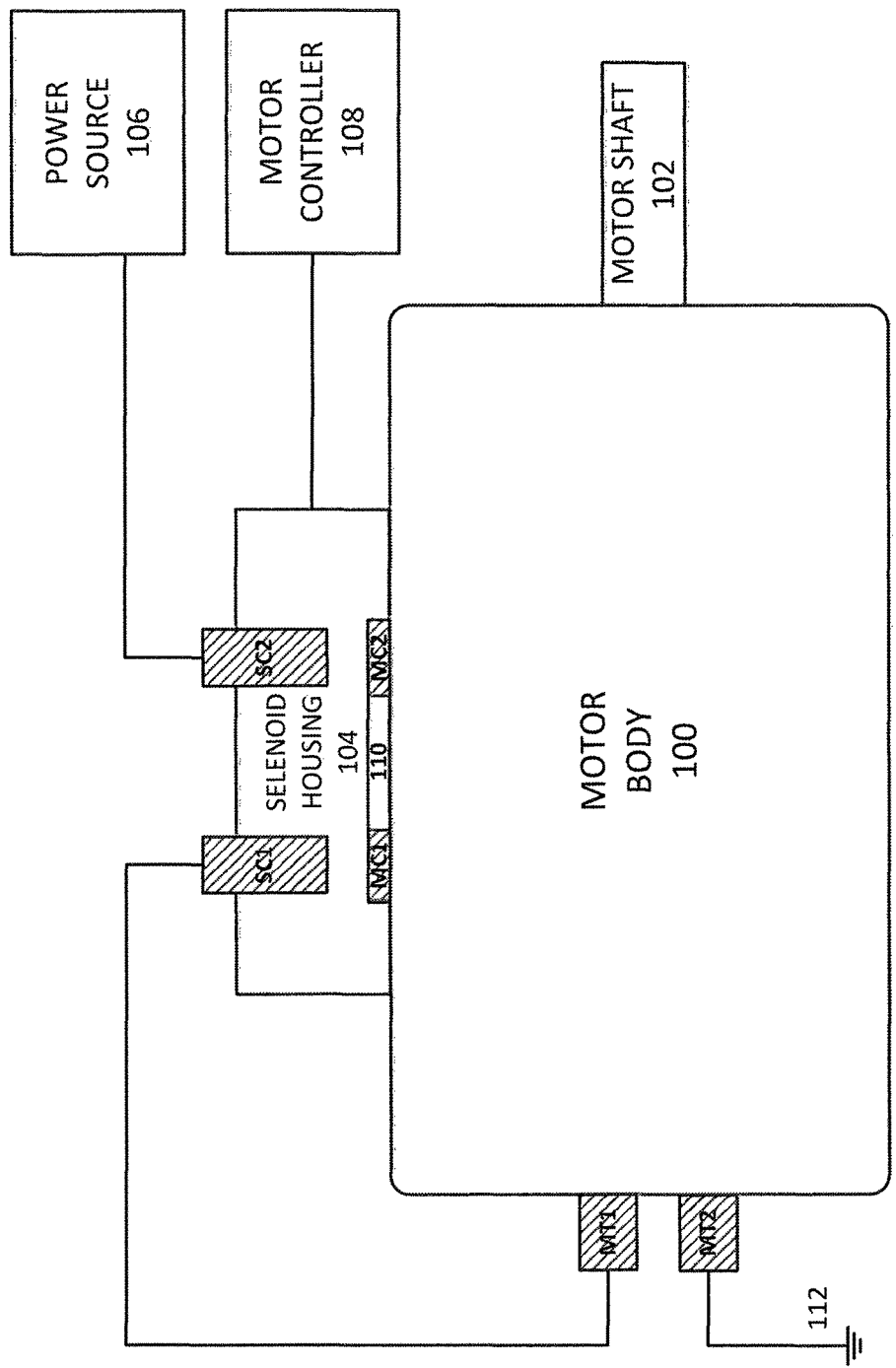
FIG. 1 shows a diagram of a motor with a solenoid mounted to its side and having serrated contacts.

In one embodiment, provided is a solenoid switch for a motor. The solenoid switch comprising a solenoid case, a solenoid having at least one control terminal positioned on an outer surface of the solenoid case, for connection to at least one external control cable, two power terminals positioned on the outer surface of the solenoid case, for connection to external power cables, two stationary serrated electrical contacts mounted within the solenoid case, each stationary serrated electrical contact electrically connected to a corresponding one of the power terminals, two movable electrical contacts coupled to the solenoid and electrically connected to windings of the motor, each movable electrical contact corresponding to one of the two stationary serrated electrical contacts, and movable by applied force of the solenoid. In response to a control signal received by the at least one control terminal, the solenoid is energized and physically moves the two movable electrical contacts to mate with the corresponding two stationary serrated electrical contacts resulting in an electrical connection between the power cables and the motor windings.

In one embodiment, provides is a solenoid switch. The solenoid switch comprising a solenoid case, a solenoid having at least one control terminal positioned on an outer surface of the solenoid case, for connection to at least one external control cable, two power terminals positioned on the outer surface of the solenoid case, for connection to external power cables, a stationary serrated electrical contact mounted within the solenoid case, and electrically connected to one of the power terminals, a movable non-serrated electrical contact coupled to the solenoid and electrically connected to an electrical load, the movable non-serrated electrical contact corresponding to the stationary serrated electrical contact, and movable by applied force of the solenoid. In response to a control signal received by the at least one control terminal, the solenoid is energized and physically moves the movable non-serrated electrical contact to mate with the corresponding stationary serrated electrical contact resulting in an electrical connection between the power cables and the electrical load.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Solenoid switches are popular devices for performing remote switching of power to large electrical loads. These solenoid switches generally include both stationary and moveable electrical contacts made of a conductive metal such as copper. The moveable electrical contacts are attached to a moveable core that is surrounded by a solenoid coil. When a small electrical current is applied to the solenoid coil, the moveable core reacts to the magnetic field produced by the solenoid coil and applies a force to the moveable electrical contact thereby forcing the moveable electrical contact to come in physical contact with the stationary electrical contact. This creates an electrical circuit between the load (e.g. the motor) and the power source.

Due to the capabilities of solenoid switches, they have been implemented in various applications including power switching applications for electric motors. An example of a solenoid switching application for an electric motor is shown in FIG. 1 where a solenoid switch is mounted to the side of an electric motor. The motor includes motor body 100, motor shaft 102 and motor power terminals MT1 and MT2. The solenoid switch includes a solenoid housing 104 (e.g., made of metal, plastic or the like) which houses various internal components of the solenoid switch. These internal components include stationary contacts SC1, SC2 and moveable contacts MC1 and MC2. In addition, (although not shown), the solenoid housing 104 also houses various other components such as the solenoid coil, return springs, etc., which are described in detail with respect to the later figures.

In FIG. 1, power source 106 is electrically connected to stationary contact SC2, and stationary contact SC1 is connected to motor power terminal MT1 which is connected to the motor coils (not shown). Motor power terminal MT2, which is also connected to the motor coils (not shown) is connected to ground 112. This configuration allows motor controller 108, which is connected to the solenoid coils within solenoid housing 104 (not shown), to control MC1 and MC2 open or close simultaneously, thereby connecting/disconnecting the power source 106 to/from the motor terminal MT1.

For example, when no power is applied to the solenoid coils by motor controller 108, then both switches MC1 and MC2 are opened and the motor is turned OFF. In one example, when motor controller 108 applies a voltage to the solenoid coils, then MC1 and MC2 both move to mate with SC1 and SC2 respectively. This effectively applies an electrical current from power source 106 to the motor coils (not shown) via MT1, thereby forcing the motor to spin.

As described in the background, when a solenoid switch is installed in cold weather climates, moisture can build up inside the solenoid housing 104 (and in particular on the mating surfaces of the electrical contacts SC1, SC2, MC1 and MC2). This moisture can then turn into ice which provides an insulating barrier between the electrical contacts.

If ice forms on the surfaces of the electrical contacts, proper electrical connection may not be made between the contacts during operation. For example, motor controller 108 may apply a voltage to solenoid coil to force movable contacts MC1 and MC2 to mate with stationary contacts SC1 and SC2. However, since there is ice on these contacts, a layer of ice may prevent the metal contacts (e.g., the copper contacts) from actually touching one another. This may result in a malfunction of the motor (i.e., the motor not turning ON).

Figure 2:
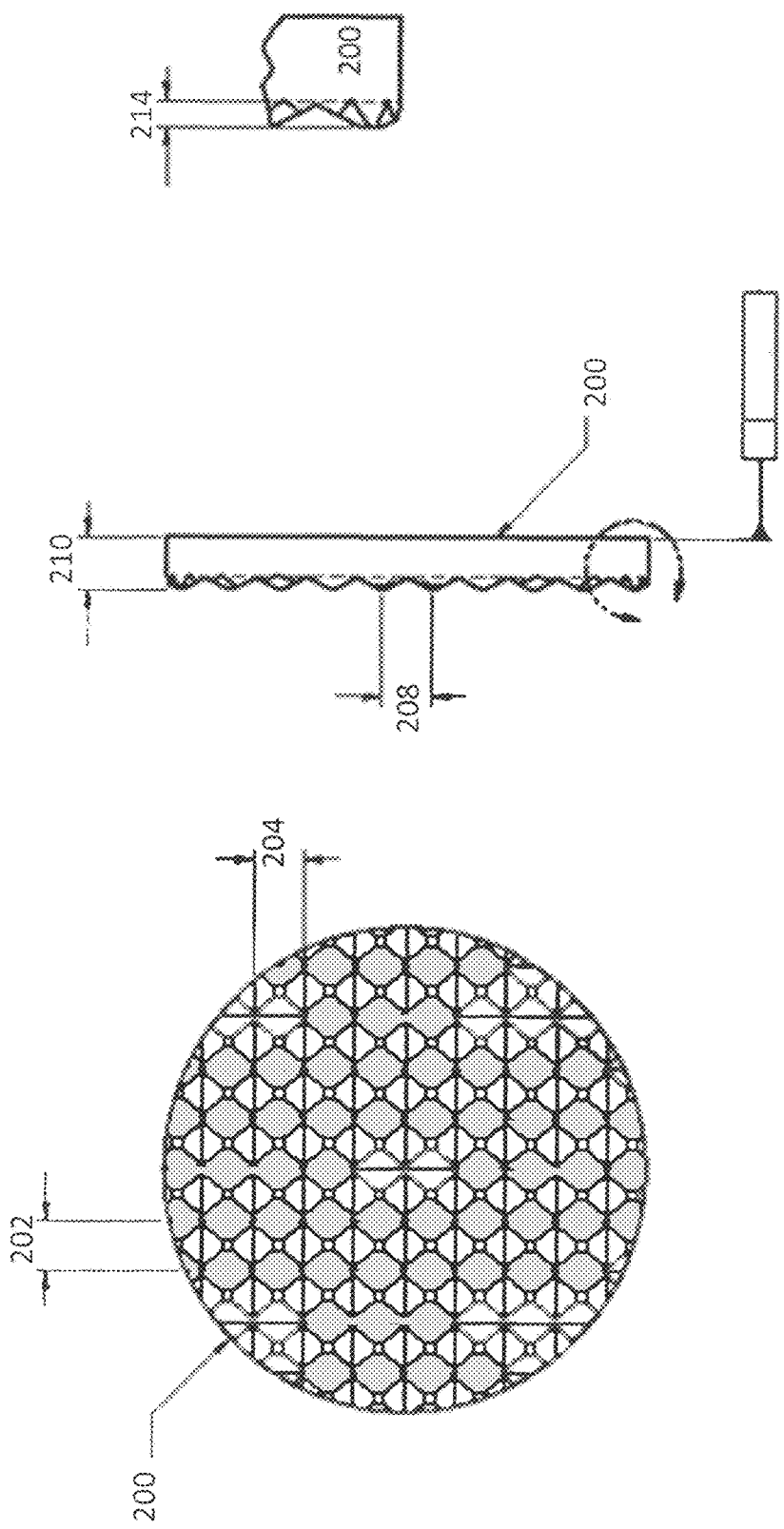
FIG. 2 shows a mechanical drawing of the mating surface of the serrated contact.

In order to address this problem, at least both the stationary contacts or both the moveable contacts are fitted with a serrated surface. This serrated surface is shown in FIG. 2 as serrated disk 200. Serrated disk 200, for example, may be the mating surface of the stationary contact SC1 and stationary contact SC2 shown in FIG. 1.

This serrated disk may include multiple small serrations of a specific three dimensional shape and size that create pressure points during mating. For example, the serrations shown in FIG. 2 are roughly pyramid in shape having a base length and width shown as 202 and 204. The distance between each of the serrations is shown as 208 while the overall depth 210 of contact face 206 is shown. Also shown in FIG. 2 is height 214 of the pyramid serrations with respect to the electrical contact 212.

By including serrations on the electrical contacts shown in FIG. 2, various benefits are realized. First, the serrations provide valleys where the condensation can pool without effecting the electrical contacts of the peaks of the serrations. For example, if ice forms within the valleys, it does not affect the overall operation, because the electrical connection is not performed in the valleys but rather on the peaks of the serrations. Second, the peaks of the serrations provide various pressure points that can actually break through any ice that has formed. For example, if the stationary contact SC1 is serrated, whereas the moveable contact MC1 is not serrated, the serrations can break through any ice that is formed on moveable contact MC1. In either case, a proper electrical connection is made between the contacts.

It should be noted that serrated electrical disk 206 shown in FIG. 2 may be joined to the surface of the terminals shown in FIG. 1 using a brazing process. For example, terminal SC1 may be manufactured separately from serrated disk 206. These two items may then be joined together by brazing with a filler material that melts at a relatively high temperature.

Figure 3:
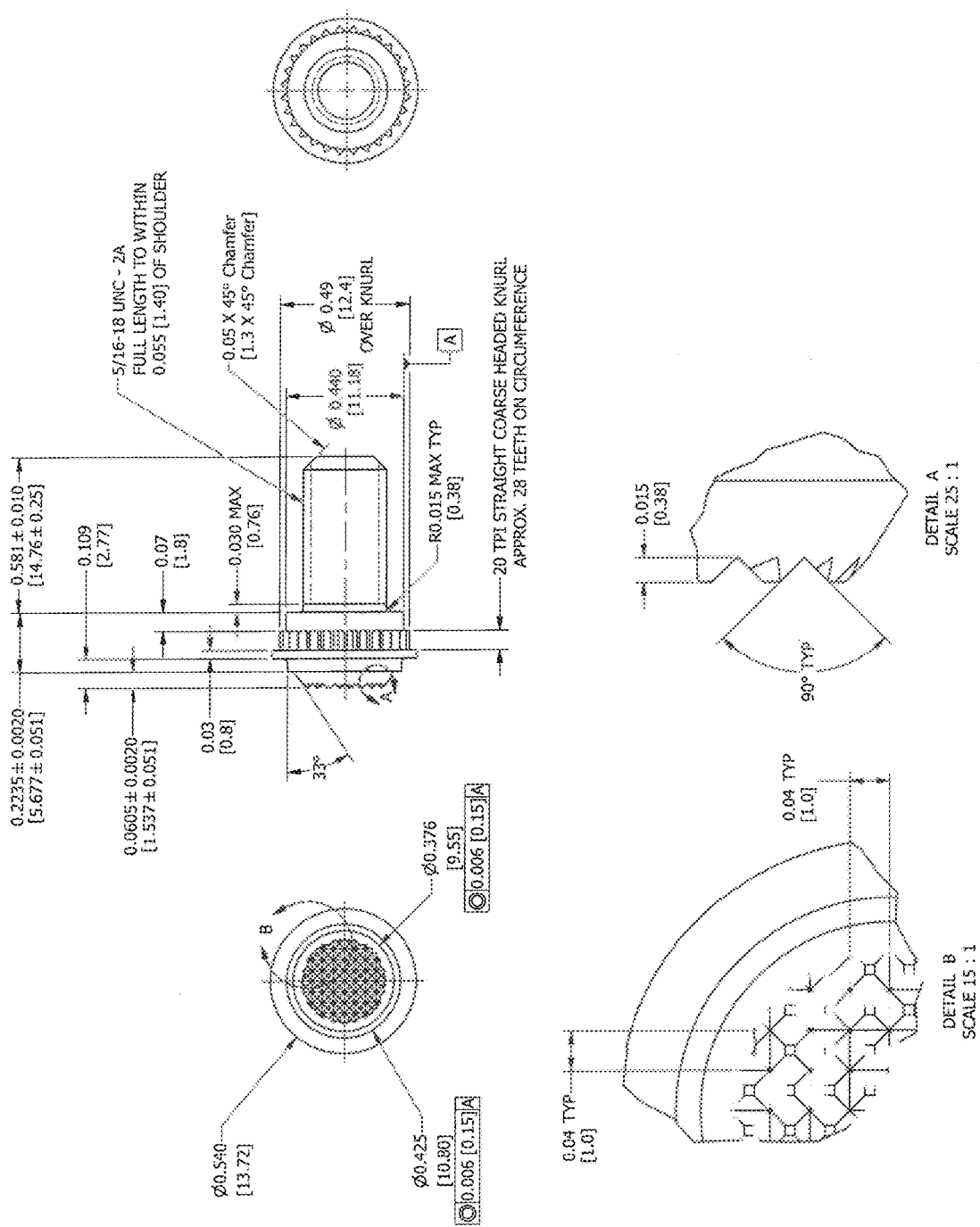
FIG. 3 shows another mechanical drawing of the mating surface of the serrated contact.

Although the serrated face may be brazed onto the electrical contact shown in FIG. 1, the electrical contacts may also be directly manufactured with a serrated face. A side view of an electrical contact manufactured directly with a serrated face is shown in FIG. 3 as unified electrical contact 300. The serrated contact 300 may include a base, a collar and a serrated face formed from the same piece of metal (e.g., copper). Various views of the serrated face of this unified contact is shown as 302, 304, 306 and 308.

For example, 302 shows an image of the serrated face from the a bottom view. 304 shows an image of the serrated face from a magnified bottom view. 306 shows an image of the serrated face from a magnified side view. 308 shows an image of the terminal from a top view. This unified electrical contact 300 can be molded directly into the solenoid housing 104 as the stationary electrical contact.

Figure 4:
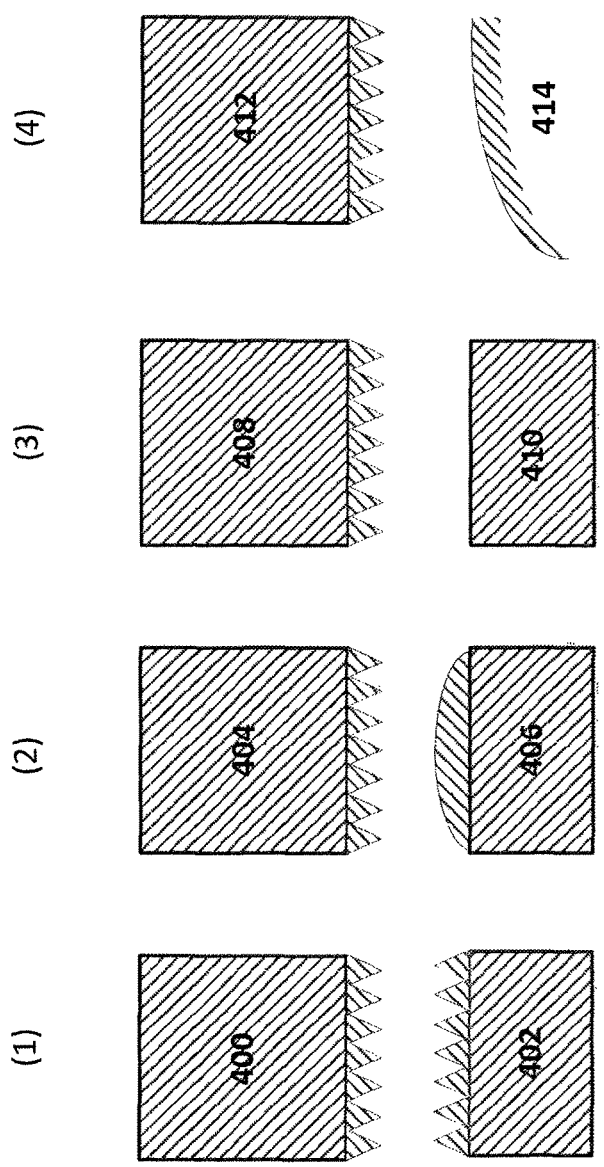
FIG. 4 shows four combinations of the serrated contact mating with other types of contacts.

In order to ensure that icing on the electrical contacts is not problematic, there are various possible combinations when utilizing the serrated electrical contacts. These various combinations are shown in FIG. 4 where the stationary contacts that may or may not have serrations are mated with moveable contacts that may or may not have serrations.

Example 1 shows a serrated stationary contact 400 mated with another serrated moveable contact 402. Example 2 shows a serrated stationary contact 404 mated with a dome faced electrical contact 406. The dome faced contact further provides prevention of icing since the condensation simply rolls off of the domed surface. Example 3 shows a serrated stationary electrical contact 408 mated to a basic flat faced moveable electrical contact 410. Any ice that develops on the flat surface of moveable contact 410 is be chopped through by the serrations on stationary contact 408. Example 4 shows a serrated stationary contact 412 mated to a curved blade 414. The curved blade 414 essentially provides a curved surface where any moisture rolls off prior to turning into ice. Any remaining ice that does exist, is chopped through by the serrations on contact 412.

It should be noted that although the stationary contacts are shown to have serrations in all four of these examples, that the stationary contact may not have any serrations. The examples shown in FIG. 4 may be swapped such that the moveable contact always has the serrations and the stationary contacts may have serrated and the other non-serrated type surfaces. As long as at least one of the contacts (i.e., the moveable or the stationary contact) has serrations, operation in icing conditions is improved. By implementing these various combinations of serrated contacts and non-serrated contacts in a solenoid switch, any moisture that develops within the switch does not pose a problem if and when it occurs.

Figure 5:
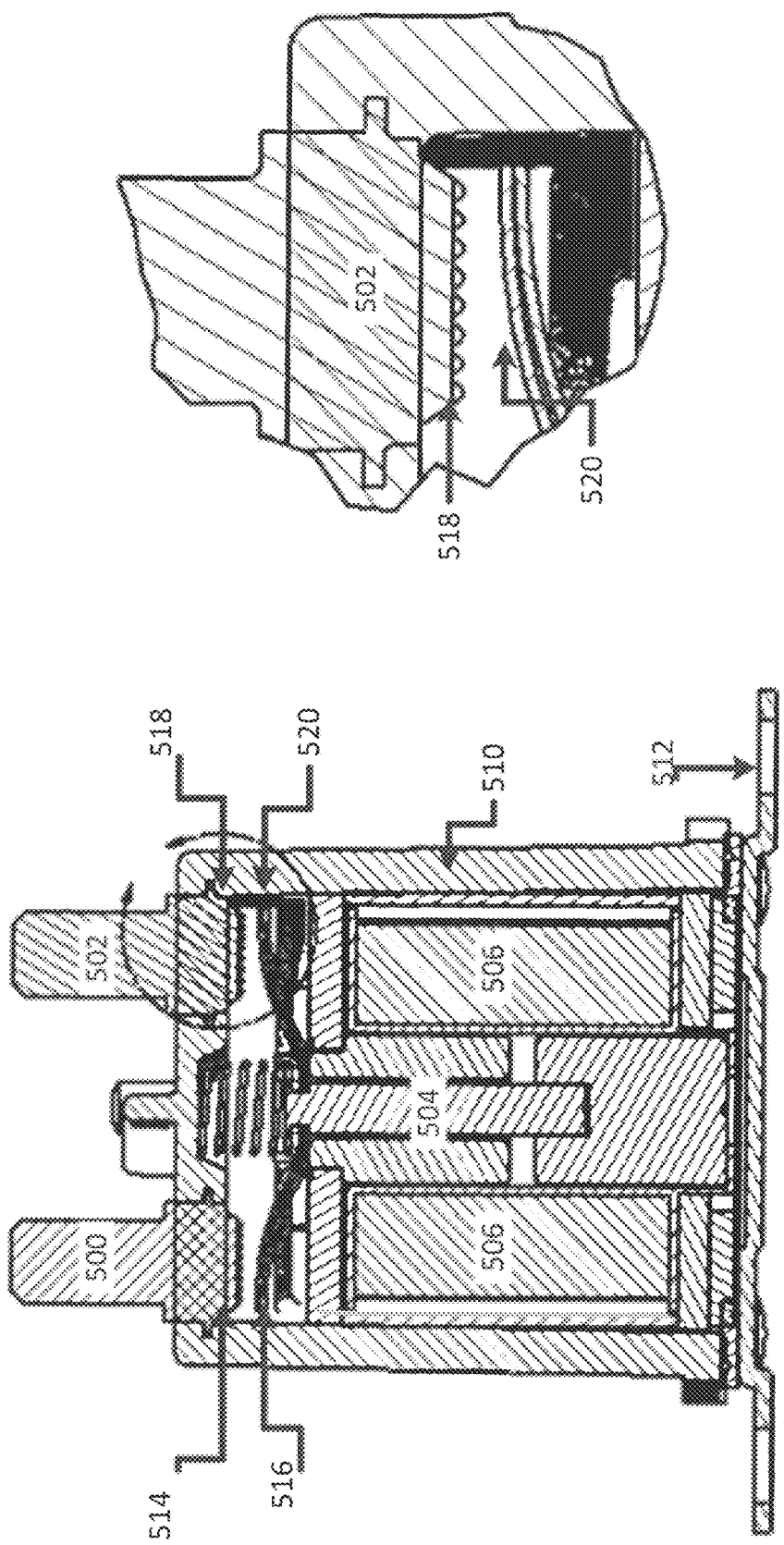
FIG. 5 shows a cross sectional mechanical drawing of the solenoid with serrated contacts mating to blade contacts.

An example of an overall configuration of a solenoid switch that includes the serrated and/or non-serrated contacts is shown in both FIGS. 5 and 6. Specifically, FIG. 5 shows an example of a solenoid switch that implements combination 4 shown in FIG. 4, whereas FIG. 6 shows an example of a solenoid that implements combination 1 in FIG. 4.

For example, FIG. 5 shows an example of a solenoid switch which includes two stationary contacts 500 and 502 and two moveable contacts 516 and 520. The stationary contacts 500 and 502 include serrated faces 514 and 518, whereas the moveable electrical contacts 516 and 520 are implemented as curved blades. These curved blades 516 and 520 are physically connected to a rod 504 that is pushed up and down in the vertical direction in response to a magnetic field applied by solenoid coil 506. It should be noted that the internal solenoid components are mounted within a solenoid housing 510 and mounted (e.g., to a motor) by bracket 512.

The configuration shown in FIG. 5 shows that the bladed contacts 516 and 520 create an electrical connection between the stationary contacts 500 and 502. Essentially, contacts 500 and 502 are electrically connected to one another through the load to complete the circuit and turn on the motor. Once the solenoid coil 506 is de-energized, force is no longer applied to rod assembly 504 and the force of the return spring opens the connection between the stationary contacts and the moveable contacts thereby turning off the load (e.g., turning off the motor).

A close up view of the electrical contacts is also shown in FIG. 5 where the serrated surface 518 of stationary contact 502 and the curved blade surface 520 of the moveable contact are shown in detail. The curved blade 520 in this example has a benefit in that any condensation (e.g., water) that forms on the curved blade simply rolls off the contact area where the blade contacts the serrated surface 518. This ensures that ice does not form on the curved surface. However, even if ice does form on curved surface 520, the serrated surface 518 breaks through any layers of ice when the moveable contact 520 is pressed up against stationary contact 502.

Another example of a solenoid switch is shown in FIG. 6. FIG. 6 similarly includes a solenoid housing 610 and a mounting bracket 612. Mounting bracket 612 shown in FIG. 6, however, is slightly different in that it includes holes for mounting the solenoid switch in a different orientation (e.g., perpendicular orientation to that shown in FIG. 5). Similar to FIG. 5, the solenoid switch in FIG. 6 also includes stationary contacts 600, 602 which include serrated surface 614 and 618, respectively. In addition, the solenoid switch in FIG. 6 also includes a moveable contact assembly 604 that includes two moveable electrical contacts 616 and 620. However, 616 and 620 are not curved surface blades. 616 and 620 are actually serrated contacts as well. Thus, both the stationary and moveable contacts have serrated surfaces in the example shown in FIG. 6.

During operation, the controller applies an electrical current to solenoid coil 606 which generates a magnetic field that pushes the electrode assembly 604 upwards towards the stationary contacts 600 and 602. This forces surfaces 614/618 to mate with surfaces 616/620 and complete the circuit. When an electrical current is not applied to the solenoid coil 606, the assembly is pushed back down away from the stationary coils by the force of the return spring and the circuit is opened.

A close up view of the mating between stationary electrical contact 602 and moveable electrical contact 620 is also shown in FIG. 6. Specifically, the serrated surfaces 618 and 620 are aligned with one another and come in contact with one another when the moveable electrical contact assembly 604 is pushed up towards the stationary contact 602 by a magnetic force. By implementing both the stationary and moveable electrical contacts with serrated surfaces, this assures that ice does not form on the peaks of the serrations, and any ice that does form is broken away by the pressure point of each of the serration peaks. This ensures good electrical contact between the stationary and moveable electrical contacts.

Figure 7:
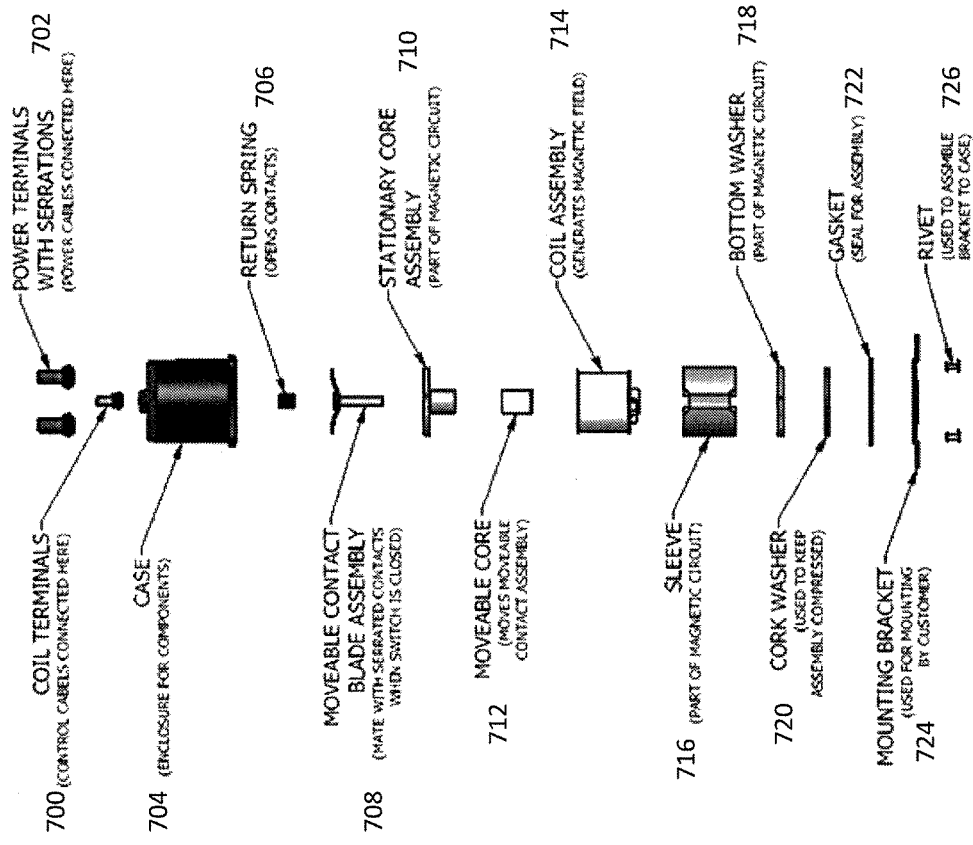
FIG. 7 shows an exploded mechanical drawing of the solenoid.
Figure 8:
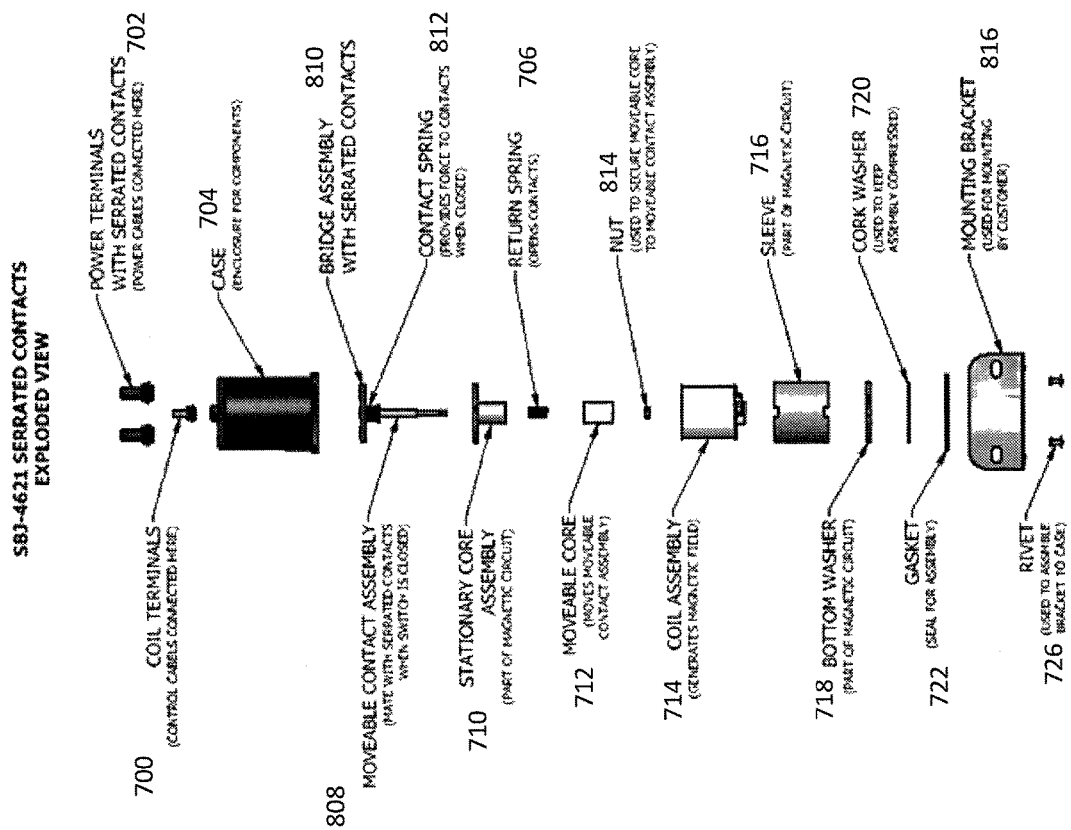
FIG. 8 shows another exploded mechanical drawing of the solenoid.

To support the further understanding of the solenoid examples shown in FIGS. 5 and 6, an exploded view is provided in FIGS. 7 and 8. In general, FIG. 7 shows an exploded view of the solenoid switch shown in FIG. 5, whereas FIG. 8 shows an exploded view of the solenoid switch shown in FIG. 6. These exploded views are now be described in detail.

In FIG. 7, for example, the internal components of the solenoid switch shown in FIG. 5 are exploded in detail. These components include power terminals that are connected to the stationary electrical contacts with serrations 702, solenoid coil terminals 700 for controlling power to the solenoid coil, case 704 for enclosing all the solenoid switch components, return spring 706 for opening the contacts when power is not applied to the solenoid coil, a moveable contact blade assembly 708 with two curved blade electrical contacts for making electrical connection with the stationary electrical contacts, a stationary core assembly 710 which is part of the magnetic circuit, a moveable core 712 which moves the moveable contact blade assembly 708 up and down in the vertical direction in response to a magnetic field applied by coil assembly 714, a sleeve 716 and bottom washer 718 which are both part of the magnetic circuit of the coil assembly, a cork washer 720 which keeps the assembly compressed inside the housing, a gasket 722 which acts as a seal to prevent air and liquid from entering the housing, mounting bracket 724 which mounts the overall solenoid switch to a stationary object (e.g., a motor), and rivets 726 which are used to assemble the bracket to the case.

It should be noted that the power terminals and coil terminals 702 and 700, respectively, are molded into the top portion of case 704. The power terminals are essentially the stationary electrical contacts which come into electrical contact with moveable contacts on the blade assembly 708 when power is applied to coil assembly 714. The coil terminals 700 are electrically connected to coil assembly 714 and apply electrical current to this assembly in order to generate a magnetic field to move the moveable assembly 708 up and down in a vertical direction. When the moveable contact blade assembly 708 is moved up in a vertical direction based on a magnetic field produced by coil assembly 714, the curved blade on assembly 708 makes electrical contact with the serrated surfaces of power terminal 702 thereby completing the circuit and applying power to a load (e.g., a motor).

The exploded view of the solenoid switch shown in FIG. 8 is that of the solenoid switch shown in FIG. 6. The exploded view in FIG. 8 includes many of the same elements of that of the exploded view in FIG. 7. However, some of the features are different.

For example, the moveable contact assembly 808 is different because it includes a bridge assembly 810 having serrated contacts, and a contact spring 812 which provides force to aid the contacts when being closed. In addition, the return spring 706 is positioned in a different location between stationary core assembly 710 and moveable core 712. Furthermore, a nut 814 is used to secure the moveable core to the moveable contact assembly. In addition, mounting bracket 816 includes mounting holes that allow the solenoid switch to be mounted in an orientation that is perpendicular to the orientation being mounted as shown in FIG. 7.

During operation, when a voltage is applied to coil assembly 714, a magnetic field is generated which pushes the moveable contact assembly 808 up in a vertical direction. This results in the bridge assembly with serrated contacts 810 coming into contact with power terminals 702 thereby completing the circuit and turning on the load (i.e., the motor).

As mentioned with respect to FIG. 5, the curved blade moveable contacts are beneficial because they direct water away from the surface of the contact where the connection is made thereby minimizing icing that that forms between the electrical connections. More detailed views of this curved blade assembly are shown in FIGS. 9 and 10.

Figure 9:
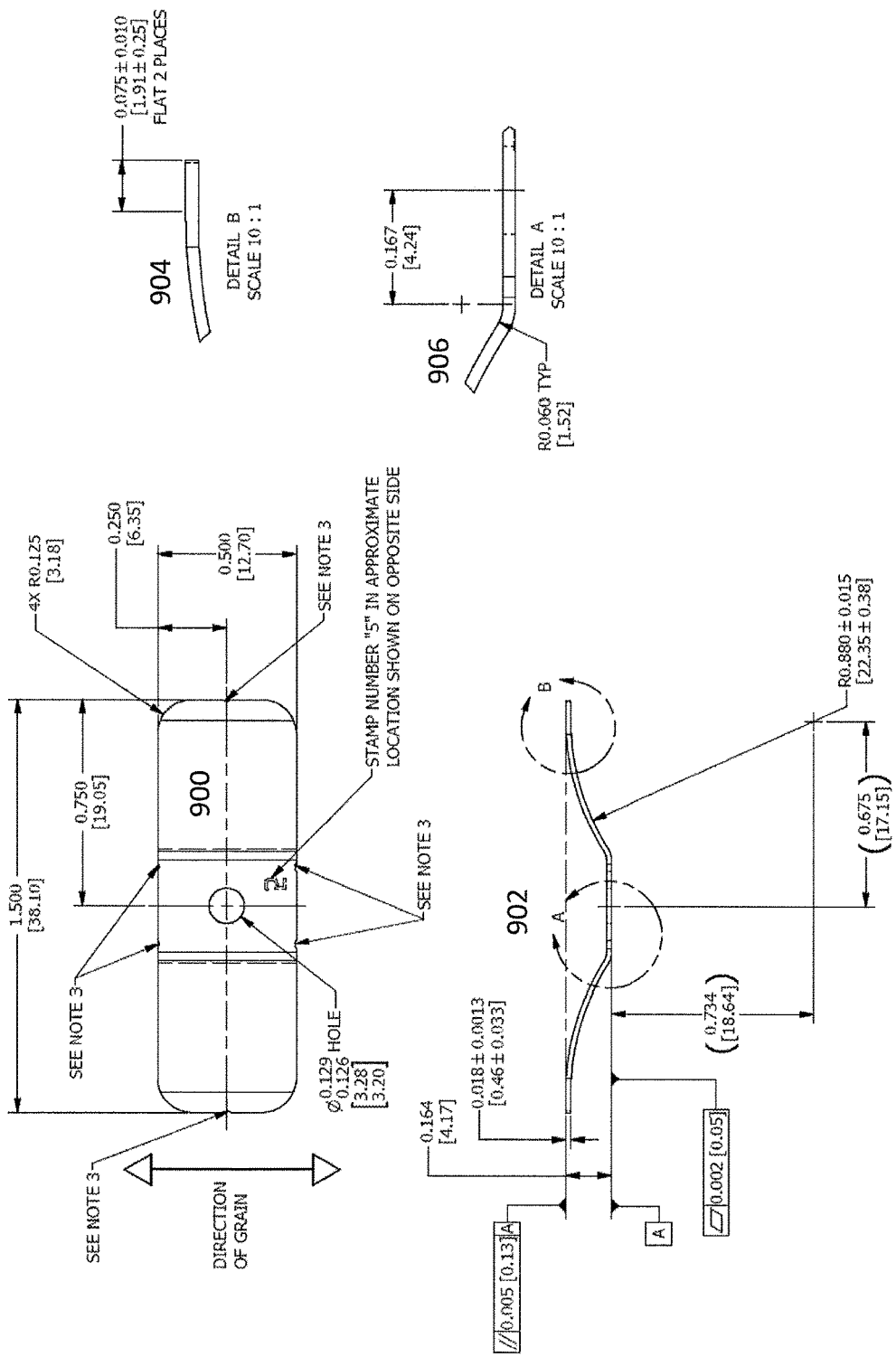
FIG. 9 shows a mechanical drawing of the movable contacts in the solenoid.

For example, in FIG. 9 shows a top view 900 of the curved blade which includes a center mounting hole and the flat portion position, in between two curved portions. The orientation between the flat portion A is shown in view 902 with respect to the curved portions on the side. Further views of the curved portion can be shown in views 904 and 906, respectively.

Figure 10:
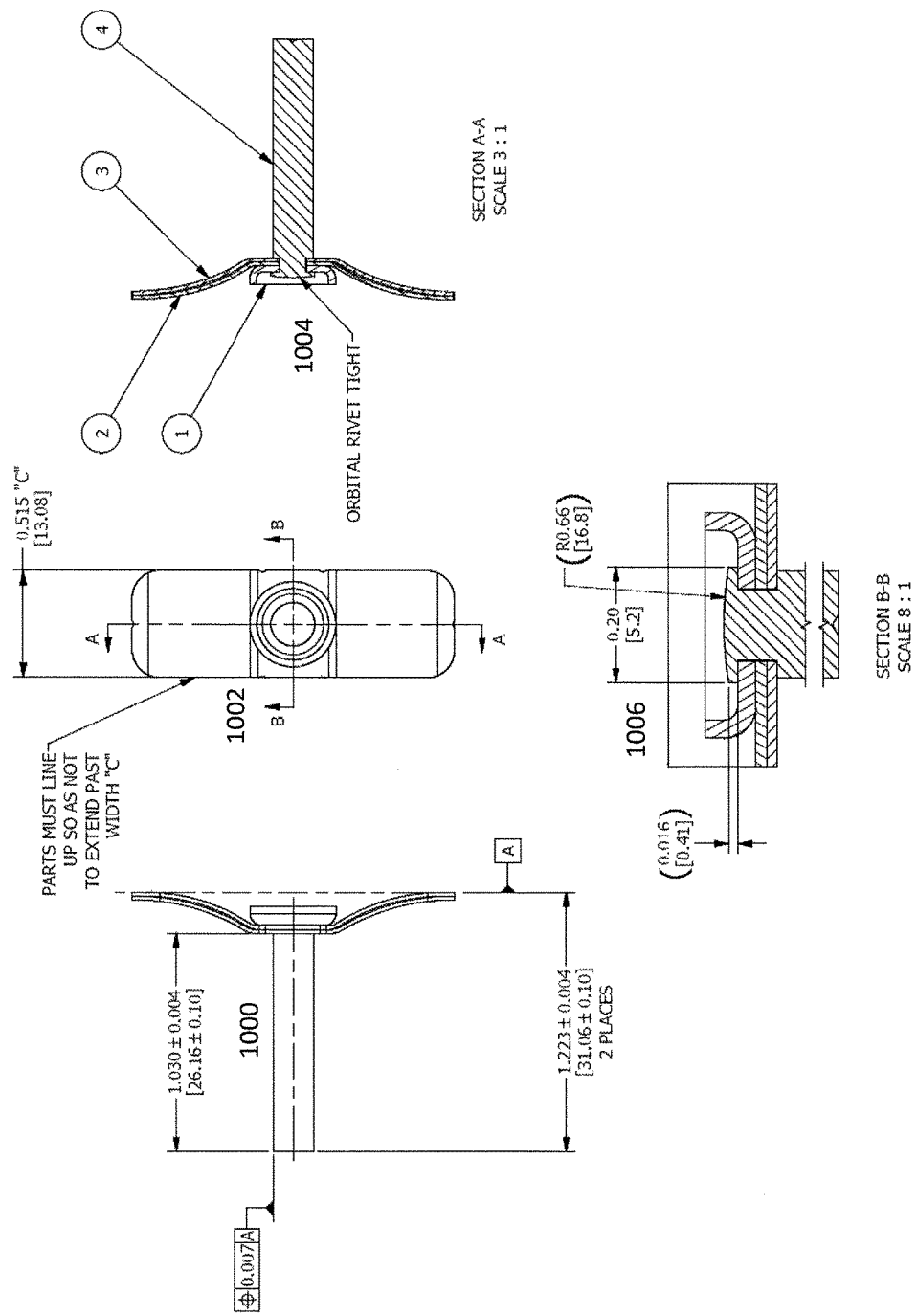
FIG. 10 shows another mechanical drawing of the movable contacts in the solenoid.

FIG. 10 shows a view of the entire curved blade assembly which not only includes the curved blade but also the rod to which the curved blade is mounted. Two side views of the curved blade assembly are shown in views 1000 and 1004. A top view of the curved blade assembly is shown in view 1002. A cross sectional view of the assembly is shown in view 1006. In general, force is applied to the rod shown in view 1004 which pushes the entire assembly up in the vertical direction within the solenoid housing thereby forcing the curved blade to come in contact with the serrated portion of the stationary electrical contacts.

As shown in the figures, serrated contacts provide the benefits of reducing the amount of ice that forms on the electrical contacts and also the ability to chop through any ice that does form. This ensures that a quality electrical connection occurs between the stationary and moveable electrical contacts. The solenoid switch may be implemented in various applications including electric motor applications as described above. In these electric motor applications, the solenoid housing 104 may be mounted directly to the side of the electric motor as shown in FIG. 1. The solenoid housing is then electrically connected to a power source, a motor controller and then also to the power terminals of the motor (not shown). This generally allows the motor controller to open and close the solenoid switches to either apply or not apply power to the power terminals of the motor.

Aside from the motor applications, the solenoid can also be implemented in just about any application where an electrical relay is beneficial. These may include various power circuits in residential, commercial and industrial settings. Regardless of the application, the solenoid switch of the present invention ensures that the proper electrical connection is made between the moveable and stationary electrical contacts even when icing would otherwise be an issue.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. A solenoid switch for a motor, the solenoid switch comprising:
    a solenoid case;
    a solenoid having at least one control terminal positioned on an outer surface of the solenoid case, for connection to at least one external control cable;
    two power terminals positioned on the outer surface of the solenoid case, for connection to external power cables;
    two stationary serrated electrical contacts mounted within the solenoid case, each stationary serrated electrical contact electrically connected to a corresponding one of the power terminals;
    two movable electrical contacts coupled to the solenoid and electrically connected to windings of the motor, each movable electrical contact corresponding to one of the two stationary serrated electrical contacts, and movable by applied force of the solenoid,
    wherein in response to a control signal received by the at least one control terminal, the solenoid is energized and physically moves the two movable electrical contacts to mate with the corresponding two stationary serrated electrical contacts resulting in an electrical connection between the power cables and the motor windings.

2. The solenoid switch of claim 1,
    wherein both of the movable electrical contacts are at least one of a curved blade contact, a flat surfaced contact, or a domed surface contact.

3. The solenoid switch of claim 1,
wherein both of the two stationary serrated electrical contacts are molded to have a serrated surface for making electrical connections.

4. The solenoid switch of claim 1,
wherein the two movable electrical contacts are configured as a single unit that moves the two movable electrical contacts simultaneously.

5. The solenoid switch of claim 1,
wherein the two stationary serrated electrical contacts are molded into the solenoid case.

6. The solenoid switch of claim 1,
wherein the solenoid includes a solenoid coil and a return spring, and
wherein the return spring applies a force to the two movable electrical contacts in an opposite direction as the force applied by the solenoid coil, to disconnect the two movable electrical contacts from the two stationary serrated electrical contacts.

7. The solenoid switch of claim 1,
wherein each of the two movable electrical contacts are blades that include a flat mounting portion mounted to a contact assembly, the flat portion positioned in between two curved blade portions which contact the two stationary serrated electrical contacts respectively when the solenoid coil is energized.

8. The solenoid switch of claim 1,
wherein both of the two stationary serrated electrical contacts include a plurality of serrations, each having a pyramid shape.

9. The solenoid switch of claim 1, further comprising:
a mounting bracket attached to the solenoid case.

10. The solenoid switch of claim 9, further comprising:
wherein the solenoid switch is mounted to a side of the motor by screwing or clamping the mounting bracket to the motor.

11. A solenoid switch, the solenoid switch comprising:
a solenoid case;
a solenoid having at least one control terminal positioned on an outer surface of the solenoid case, for connection to at least one external control cable;
two power terminals positioned on the outer surface of the solenoid case, for connection to external power cables;
a stationary serrated electrical contact mounted within the solenoid case, and electrically connected to one of the power terminals;
a movable non-serrated electrical contact coupled to the solenoid, the movable non-serrated electrical contact corresponding to the stationary serrated electrical contact, and movable by applied force of the solenoid,
wherein in response to a control signal received by the at least one control terminal, the solenoid is energized and physically moves the movable non-serrated electrical contact to mate with the corresponding stationary serrated electrical contact resulting in an electrical connection between the power cables and an electrical load.

12. The solenoid switch of claim 11,
wherein the movable non-serrated electrical contact is at least one of a curved blade contact, a flat surfaced contact, or a domed surface contact.

13. The solenoid switch of claim 11,
wherein the stationary serrated electrical contact is molded to have a serrated surface for making an electrical connection.

14. The solenoid switch of claim 11,
wherein the movable non-serrated electrical contact is configured on an assembly that is in proximity to the solenoid coil.

15. The solenoid switch of claim 11,
wherein the stationary serrated electrical contact is molded into the solenoid case.

16. The solenoid switch of claim 11,
wherein the solenoid includes a solenoid coil and a return spring, and
wherein the return spring applies a force to the movable non-serrated electrical contact in an opposite direction as the force applied by the solenoid coil, to disconnect the movable non-serrated electrical contact from the stationary serrated electrical contact.

17. The solenoid switch of claim 11,
wherein the movable non-serrated electrical contact is a blade that includes a flat mounting portion mounted to a contact assembly, the flat portion positioned adjacent to a curved blade portion which contact the stationary serrated electrical contact when the solenoid coil is energized.

18. The solenoid switch of claim 11,
wherein the stationary serrated electrical contact includes a plurality of serrations, each having a pyramid shape.

19. The solenoid switch of claim 11, further comprising:
a mounting bracket attached to the solenoid case.

20. The solenoid switch of claim 11,
wherein the solenoid switch is mounted to a side of the motor by screwing or clamping the mounting bracket to a motor.

* * * * *